United States Patent [19]
Normant

[11] 3,917,602
[45] Nov. 4, 1975

[54] PREPARATION OF ALKALI METAL AMIDES
[75] Inventor: Henri Marie Normant, Paris, France
[73] Assignee: Rhone-Poulenc S.A., Paris, France
[22] Filed: Dec. 5, 1972
[21] Appl. No.: 312,273

Related U.S. Application Data
[63] Continuation-in-part of Ser. No. 838,687, July 2, 1969, abandoned.

[30] Foreign Application Priority Data
July 3, 1968 France ............................ 68.157756

[52] U.S. Cl...... 260/268 R; 260/293.51; 260/326.8; 260/563 R; 260/563 C; 260/570.8; 260/570.9; 260/574; 260/577; 260/583 R; 260/584 C
[51] Int. Cl.$^2$...................................... C07D 295/00
[58] Field of Search........ 260/326.8, 293.51, 268 R, 260/563 C, 583 R, 551 R, 563 R, 577

[56] References Cited
UNITED STATES PATENTS
3,560,531    2/1971    Normant............................ 260/279
FOREIGN PATENTS OR APPLICATIONS
1,448,021    6/1966    France Primary Examiner—Donald G. Daus
Assistant Examiner—Jose Tovar
Attorney, Agent, or Firm—Cushman, Darby & Cushman

[57] ABSTRACT
This invention discloses a process for preparing an alkali metal amide which comprises reacting an alkali metal in the presence of hexamethylphosphotriamide and an aromatic hydrocarbon with ammonia or with an amine having at least one hydrogen atom bonded to an amine nitrogen atom.

8 Claims, No Drawings

PREPARATION OF ALKALI METAL AMIDES

This application is a continuation-in-part of my Application Ser. No. 838,687 filed July 2nd 1969 and now abandoned.

The present invention relates to the preparation of alkali metal amides.

The metallization of amines by reaction with organolithium compounds according to the following reaction scheme:

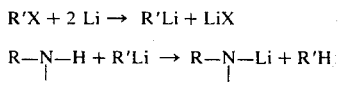

is known. In contrast the present invention has the advantages that: it provides a single stage reaction; an organic halide R'X does not have to be used; and there is complete utilisation of the alkali metal (1 gram atom per atom of hydrogen bonded to the nitrogen), while 50% is lost as alkali halide during the previously known process.

Also amines of low acidity, i.e. amines whose acidity is less than that of ammonia and whose pKa is greater than about 34, which is particularly the case for aliphatic amines, can be metallized directly by the process of the present invention. It is known that only arylamines can be metallized by alkali metals dissolved in liquid ammonia.

The process of the present invention for preparing an alkali metal amide comprises reacting an alkali metal in the presence of hexamethylphosphotriamide and an aromatic hydrocarbon with ammonia or with an amine having at least one hydrogen atom bonded to an amine nitrogen atom.

Lithium and potassium are the most frequently used alkali metals. To facilitate their reaction, it is often preferable to use them in a divided form, for example as wire, strip or granules.

The amines used contain at least one free hydrogen atom bonded to an amine nitrogen atom. Thus they are primary or secondary amines but may be chosen from many diverse amines and can include monoamines, polyamines, aliphatic, cycloaliphatic, heterocyclic, aromatic (i.e. non-heterocyclic) and araliphatic amines. Specific suitable amines are aliphatic amines in which each alkyl radical contains 1 to 12 (preferably 1 to 4) carbon atoms, for example dimethylamine, diethylamine, the dipropylamines, the butylamines (n-butylamine or t-butylamine), the dibutylamines, or dilaurylamine; heterocyclic amines having 4 to 12 ring carbon atoms such as pyrrolidine, piperidine, piperazine, or N-methylpiperazine; cycloaliphatic amines having 5 to 12 ring carbon atoms, such as cyclopentylamine, cyclohexylamine, cyclooctylamine or cyclododecylamine; aromatic amines, i.e. amines containing one or two aromatic hydrocarbon residues directly attached to amino nitrogen carrying a free hydrogen atom, such as diphenylamine, or araliphatic amines, i.e. arylalkyl-amines, such as benzylamine or the phenylethylamine. These amines may be substituted by hydrocarbon or alkoxy radicals. Thus amines such as 2,5-dimethyl-piperazine or di(ethoxyethyl)amine can be used.

Any aromatic hydrocarbon may be used. The most frequently used and most convenient hydrocarbons are those which are easily accessible such as benzene, toluene, the xylenes and other alkylbenzenes. During the process, the aromatic hydrocarbon is reduced to the corresponding tetrahydrocompound, e.g. cyclohexene or an alkyl-cyclohexene, which can be identified, e.g. by nuclear magnetic resonance, and, if desired, isolated from the products of reaction, e.g. by vapour-phase chromatography. The aromatic hydrocarbon thus plays an essential part in the process of the invention and cannot be omitted.

The reaction temperature may vary within wide limits depending on the particular reagents used. This temperature is generally −30° to +50°C and preferably −30° to +30°C. but it is sometimes advantageous to start the reaction at a higher temperature. Thus the reaction may be started at a temperature as high as 70°C.

The theoretically preferred proportions of reagents are one gram atom of hydrogen bonded to the nitrogen of the molecule to be metallized, one gram molecule of aromatic hydrocarbon and one gram molecule of hexamethylphosphotriamide per one gram atom of alkali metal. For economy of the alkali metal and for better interaction between the reagents, the amount of alkali metal used is normally reduced with respect to at least one of the three other constituents of the reaction medium.

Thus 1 to 10 mols usually 1 to 3 mols of each of the other reagents may be used per gram atom of alkali metal.

It is known (Henri Normant et al., Bull. Soc. Chim. de France 1960, page 354–355) that aromatic hydrocarbons such as naphthalene react with alkali metals, e.g. sodium, in appropriate ethers, e.g. tetrahydrofuran, to form a metallated derivative of the hydrocarbon which can subsequently be reacted with an alkyne or a compound containing a reactive methylene group to form a metallated derivative of the latter. These reactions may be represented by the equations:

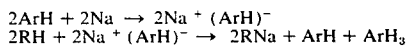

where ArH is the aromatic hydrocarbon and RH is the alkyne or compound containing reactive methylene to be metallated. It will be noted that in these reactions part of the aromatic hydrocarbon is reduced to the corresponding dihydro compound. The process cannot be operated with relatively unreactive aromatic hydrocarbons such as benzene and the alkylbenzenes.

I have also described in my U.S. Pat. No. 3560531 a process for the metallation of a wide variety of organic compounds in which an alkali metal, e.g. sodium, potassium or lithium is dissolved in hexamethylphosphotriamide and the solution obtained is then reacted with the compound to be metallated. This process may be represented by the equations:

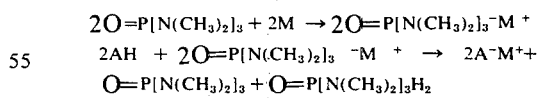

where M is the alkali metal and AH is the compound to be metallated. It will be noted that half the hexamethylphosphotriamide is lost in this process. The latter is applicable to aromatic, but not aliphatic, amines containing reactive hydrogen bonded to nitrogen. Compounds having hydrogen atoms attached to carbon atoms directly attached to at least one aromatic nucleus may also be metallated, but the aromatic nucleus is not reduced.

The process of the present invention is easier to operate than these prior processes and may be applied to the metallation of all amines containing reactive hydrogen bonded to nitrogen. It is believed to proceed in accordance with the equations:

$$4M + 4AH + ArH \rightarrow 4A^-M^+ + ArH_5$$

where M is the alkali metal, ArH is the aromatic hydrocarbon, and AH is the amine to be metallated. It will be noted that the aromatic hydrocarbon is converted into the corresponding tetrahydro compound, but that none of the hexamethylphosphotriamide is used up. Simple aromatic hydrocarbons such as benzene and the alkyl benzenes are preferably used. It is surprising that when reacting an alkali metal with ammonia or an amine in the presence of hexamethylphosphotriamide and benzene or alkylbenze the amide is formed and simultaneously the nucleus of the aromatic hydrocarbon is reduced to the corresponding tetrahydrocompound since in the process of the Bull. Soc. Chim. de France and of U.S. Pat. No. 3,560,531 the aromatic nucleus of benzene and alkylbenzenes are not reduced.

The alkali metal amides obtained by the process of this invention may be used in many known synthetic reactions such as substitution reactions, elimination reactions to form, for example, double and triple bonds, arynes, carbenes and ylids, carbanion formation, alkylation by olefines, prototropic isomerisations and polymerisations, and various molecular rearrangements. The alkali metal amides, prepared bb the process of this invention, have remarkable reactivity and are more reactive than the same amides in prior generally used solvents such as diethyl ether, tetrahydrofuran, dimethoxyethane or excess amine.

For example, lithium derivatives of piperazine of the formula :

in which A particularly represents an alkyl or phenylalkyl radical, may be reacted with esters of formula:

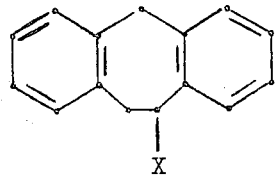

in which X represents a reactive ester residue, to form compounds of formula:

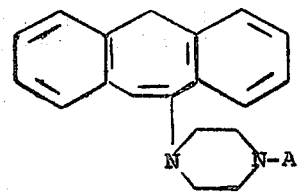

which have valuable pharmacodynamic properties (cf. French Patent Specification No. 1,468,688).

The following Examples illustrate the invention.

EXAMPLE 1

0.8 g. of lithium slices, 25 ml. of benzene, 0.15 mol of a monoamine (indicated below) and 25 ml. of hexamethylphosphotriamide are introduced into a 250 ml flask provided with a mechanical stirrer, a thermometer and a stream of dry nitrogen. The mixture is stirred and when the temperature of the reaction mixture rises 2° to 3°C and the mixture becomes coloured, it is cooled with stirring to −5° to −10°C. The lithium dissolves after a few hours to give a light red solution.

The resulting solution of lithium amide can be reacted in known manner with one reagent or with two successive reagents.

When only one reagent is used, the organolithium compound is normally cooled to a temperature of −40° to −50°C and the reagent (usually 0.1 mol) dissolved in 25 to 50 ml of dry diethyl ether is added dropwise with stirring. The mixture is allowed to return to ambient temperature (20°C), stirred for a further hour, and then decomposed in the usual manner.

When two reagents are used successively, the temperature of the mixture is allowed to rise to 0° after the first reagent has been added to the mixtures at −40° to −50°C. The mixture is then cooled again to −40° to −50°C and the second reagent (usually 0.1 mol) dissolved in diethyl ether is added gradually.

The Table below illustrates the use of alkali metal amides prepared by the process of the present invention.

TABLE

| AMIDE | 1st REAGENT | 2nd REAGENT (when used) | PRODUCT | YIELD (relative to first reagent) |
|---|---|---|---|---|
| ⬡N—Li | Me—I | | ⬡N—Me | 90% |
| ⬡—NHLi | n—Bu—I | | ⬡—NHBu (*) | 42% |
| ⬡—NHLi | D₂O | | ⬡—NHD | 88% |
| Et₂NLi | Ph—Br | | PhNEt₂ | 55% |
| Et₂NLi | Me₂CH—CH=N—⬡ | PhCH₂Cl | Me₂C(CHO)(CH₂Ph) | 78% |

TABLE-continued

| AMIDE | 1st REAGENT | 2nd REAGENT (when used) | PRODUCT | YIELD (relative to first reagent) |
|---|---|---|---|---|
| | | | | |

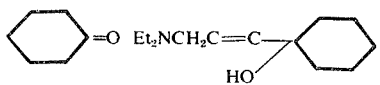

(*) N,N—di(n—butyl)cyclohexylamine is also formed.

EXAMPLE 2

25 ml. of dry benzene, 10 g. (0.1 mol) of N-methylpiperazine, treated with powdered potassium hydroxide and then vacuum distilled, 25 ml. of hexamethylphosphotriamide and 0.8 g. of lithium slices are introduced into a 250 ml. flask. The mixture is stirred and heated gently (electric lamp) and the reaction starts (appearance of a pink colour) when the temperature reaches 55°–60°C. The mixture is then cooled to 25°C and stirred at 20°C for 12 hours. A light red solution containing insoluble particles is thus obtained.

0.1 mol of dimethyl sulphate are added to this solution and the mixture then is heated to 40°–50°C. for 1 hour. After filtration and distillation, 7.5 g. of N,N'-dimethylpiperazine (boiling at 131°–132°C. under 760 mm of mercury, 65.8% yield relative to the amount of piperazine introduced) are obtained.

I claim:

1. In a process for preparing an alkali metal amide including reacting an alkali metal in the presence of hexamethylphosphotriamide, the improvement consisting essentially in using, as a reactant, benzene or an alkylbenzene, and reacting the alkali metal with ammonia or with an amine having at least one hydrogen atom bonded to an amine nitrogen atom, said benzene or alkylbenzene being reduced to the corresponding tetrahydro compound.

2. A process according to claim 1 wherein the amine has an acidity less than that of ammonia and a pKa greater than 34.

3. A process according to claim 1 wherein the said alkali metal is reacted with ammonia, a mono- or dialkylamine in which each alkyl is of 1 to 12 carbon atoms, pyrrolidine, piperidine, piperazine, N-methylpiperazine, or a cycloalkylamine of 5 to 12 ring carbon atoms.

4. A process according to claim 1 wherein the alkali metal is lithium.

5. A process according to claim 1 wherein the alkylbenzene is toluene or a xylene.

6. A process according to claim 1 wherein the reaction temperature is −30° to +50°C.

7. A process according to claim 1 wherein 1 to 10 mols of the amine and of hexamethylphosphotriamide and of the benzene or alkylbenzene are used per gram-atom of alkali metal.

8. A process according to claim 1 wherein lithium is reacted at −30° to +50°C in the presence of hexamethylphosphotriamide and benzene, toluene or a xylene, with ammonia, a mono- or di-alkylamine in which each alkyl is of 1 to 12 carbon atoms, pyrrolidine, piperidine, piperazine, N-methyl-piperazine, or a cycloalkylamine of 5 to 12 ring carbon atoms, using 1 to 10 mols of the said ammonia or amine and of hexamethylphosphotriamide and of the benzene toluene or xylene per gram-aton of lithium.

* * * * *